004-085 SH
5/26/87 03 RE 32,426

United States Patent [19]

Koziol

[11] E Patent Number: Re. 32,426

[45] Reissued Date of Patent: May 26, 1987

[54] ELECTRODE FOR FUSED MELT ELECTROLYSIS

[75] Inventor: Konrad Koziol, Rothenbach A. D. Pegnitz, Fed. Rep. of Germany

[73] Assignee: C. Conradty Nurnberg GmbH & Co. KG, Rothenbach A. D. Pegnitz, Fed. Rep. of Germany

[21] Appl. No.: 757,267

[22] Filed: Jul. 22, 1985

Related U.S. Patent Documents

Reissue of:

[64] Patent No.: 4,462,888
Issued: Jul. 31, 1984
Appl. No.: 285,561
Filed: Jul. 21, 1981

[30] Foreign Application Priority Data

Oct. 27, 1980 [EP] European Pat. Off. ..... 80106578.0

[51] Int. Cl.[3] ..... C25B 11/00; C25C 7/02; C25D 17/10

[52] U.S. Cl. ..... 204/286; 373/93

[58] Field of Search ..... 373/91, 92, 93, 94; 204/297 R, 280, 294

[56] References Cited

U.S. PATENT DOCUMENTS 4,145,564 3/1979 Andrew et al. ..... 373/93

FOREIGN PATENT DOCUMENTS 2037549 7/1980 United Kingdom ..... 373/93

*Primary Examiner*—Roy N. Envall, Jr.
*Attorney, Agent, or Firm*—Lyon & Lyon

[57] ABSTRACT

Electrode for fused melt electrolysis with a top portion (5) of metal, where appropriate with a cooling device (2, 3) and the top portion (5) has an inner part (16) and an outer part (17) which are constructed so as to be detachable from each other and the inner part (16) extends substantially close to a connection or screw-mounting (1) and the top portion (5) or the inner part (16) or at least a partial zone thereof is protected by an insulating coating (4) of high temperature stability, and at least one bottom portion (6) of active material. The electrode is suitable for the production of metals such as aluminium, magnesium, alkali metals or compounds thereof. It is characterized by reliable, energy saving operation and can be easily maintained and repaired.

34 Claims, 6 Drawing Figures

ELECTRODE FOR FUSED MELT ELECTROLYSIS

Matter enclosed in heavy brackets [ ] appears in the original patent but forms no part of this reissue specification; matter printed in italics indicates the additions made by reissue.

The invention relates to an electrode for fused melt electrolysis, more particularly for the electrolytic production of metals such as aluminium, magnesium, sodium, lithium or of compounds thereof.

Carbon electrodes, made of hard carbon or graphite, are still mainly employed for the electrolytic production of aluminium, magnesium, alkaline metals or compounds thereof on a commercial scale. Although the electrodes are intended mainly to carry current, they frequently also participate in the electrode reaction themselves. The actual electrodes consumption is therefore substantially higher than the theoretical rate of wear, due to the oxidation sensitivity of carbon electrodes under electrolysis conditions. The theoretical consumption rate in the fused melt electrolysis of aluminium is 334 kg carbon/ton of aluminium, but the actual carbon consumption amounts to approximately 450 kg of carbon/ton of aluminium.

Similar problems arise for the electrodes used in the production of magnesium, sodium, lithium and cerium metal mixes. Side reactions of an oxidizing kind on the electrode part which is immersed in the molten salt as well as losses due to atmospheric oxygen on the part which projects from the melt result in irregular and premature wear of the electrodes. To this must be added the destructive action of the graphite deposits from electrode constituents on their products. Tests have already been undertaken, in which carbon electrodes are converted into a suitable electrode material by impregnation, followed by thermochemical treatment and conversion into composite carbon-silicon carbide materials. However, in practice these tests have not led to any substantial improvement of fused melt electrolysis.

The above-described disadvantages of carbon electrodes as well as rising costs of graphite and hard carbon have given rise to the development of form-stable electrodes. It is hoped thereby not only to replace petro-carbon, a petrochemical raw material, the consumption of which in the Federal German Republic for fused melt electrolysis alone amounts to approximately 500,000 tons per annum, but also to achieve savings in energy consumption.

To this end, a number of ceramic materials, for example in accordance with the British Patent Specification 1 152 124 (stabilized zirconium oxide), the U.S. Pat. No. 4,057,480 (substantially stannic oxide), the German Offenlegungsschrift No. 27 57 898 (substantially silicon carbide valve metal boride carbon), the South American Patent Application No. 77/1931 (yttrium oxide with surface strata of electrocatalysts) or according to the German Offenlegungsschrift No. 24 46 314 (ceramic parent material with a coating of spinel compounds) have all been described. Reference will also be made to a proposal for the use of non-oxidizable compound substances with a high degree of chemical purity in accordance with the European Patent Application No. 80103126.1, filed by the Applicant on the 4th June 1980.

The disadvantage in the use of electrodes of ceramic materials in their electrical conductivity which is frequently only moderate to medium, even after the addition of conductivity-increasing components. This is acceptable only for processes in which the electrode dimensions are small and the current path is therefore short. However, this applies primarily only to electrolysis in aqueous media while electrodes for fused melt electrolysis, for example of aluminium, have substantial dimensions. For example, electrodes for the production of aluminium can have dimensions of up to 2250×950×750 mm while typical graphite electrodes for the production of aluminium can have a size of 1700×200×100 mm or a diameter of 400×2200 mm, depending on the type of process. The production of such solid blocks of the above-mentioned ceramic materials is expensive and encounters substantial difficulties with respect to stability to alternating temperatures and electrical internal resistance. Recently, the efforts of current consuming industries have been directed especially to a reduction of specific energy consumption and for this reason solid ceramic electrodes have not so far been accepted in practice.

It is the object of the invention to provide a novel kind of electrode for fused melt electrolysis, in which the above described disadvantages of the prior art are ameliorated. In particular, it is intended to provide an electrode capable of operating reliably with an exceptionally low current/voltage loss and for which the spectrum of known and future active materials can be used in the same manner. The electrode should also be particularly easy to maintain and to repair. This kind of electrode is to be used preferably as anode.

The invention provides an electrode for fused melt electrolysis, comprising a metal top portion having an inner part and an outer part detachable from one another, a bottom portion of active material connected to said top portion by screwmounting means, and an insulating coating of high temperature stability, wherein said inner part extends substantially as far as said screwmounting means and wherein said insulating coating protects at least part of said inner part.

Liquids, such as water, or gas, for example air can be used as coolants. The term "insulating" coating within the scope of the invention refers to a material which is inert and shielding with respect to the electrolysis media and can also be electrically insulating.

Electrodes comprising a cooled metal shank and a graphite part screwmounted thereon have already been proposed for use in the production of electric steel in electric furnaces in which an arc extends from the electrode tip. The existence of the arc and its possibility of travelling, the resultant extreme temperatures near to the arc as well as the atmosphere in the electric steel furnace and the kind of electrode process is so substantially different from fused melt electrolysis that the possibility of using such electrodes for performing fused melt electrolysis has not been considered. As regards the relevant prior art, reference should be made, for example, to the British Patent Specification No. 1 223 162, the German Auslegesschrift No. 24 30 817 or the European Offenlegungsschrift No. 79302809.3. The electrodes mentioned in these documents are described by reference to the special requirements of the arc electrode and in terms of the efforts made to meet the specific requirements of electro-steel production.

According to one preferred embodiment of the electrode according to the invention the inner part and the outer part of the top portion are detachable from each other so that the inner part contains a gas or liquid conducting chamber with a header duct and a return duct.

The outer part represents the terminal electrode and can be constructed of the same metal, for example copper or metal alloys or other materials, like the inner part. Cooling ports or the like can be provided in the outer part. It is also possible to provide the outer part with retaining bores, for example for guiding and supporting insulating protective strata which are disposed below.

In one preferred embodiment of the electrode according to the invention only a part region of the inner part is surrounded by the outer part so that the metal shank in its entirety can be formed from a top region of larger diameter and a bottom region of smaller diameter.

The inner part of the electrode is extended into the nipple connection by means of which the top portion of metal and the bottom portion are interconnected. The gas or liquid cooling device, which may be required for the inner part and extends axially therein is advantageously introduced into the screw nipple itself, since this can be exposed to special heat stresses, depending on the material in use.

The connection between the inner and outer part can be obtained in different ways. As a rule, the connecting line extends parallel with the electrode axis. For example, the detachable connection can be obtained by screwthreading or by appropriate register fitting of the components. It is particularly preferred if the inner part is constructed as a register member of tapered or conical form and a part region of the outer and inner part can be additionally provided with screwthreading.

Connecting jaws can be attached to the outer part by pockets or retaining means to which the current supply of the electrode is connected. Pockets, into which graphite plates or segments are introduced to supply current, are attached to the outer part in one preferred embodiment of the invention.

The insulating coating of high temperature stability, representing a moulding in accordance with the invention, can be an individual tube. Advantageously however the moulding can also be a series of tubular sections, segments, half shells or the like which surround the bottom region of the top portion of the electrode and into the region of the screw nipple and where appropriate beyond the screw nipple. For most uses of the electrode or anode according to the invention it is particularly advantageous if at least the region of the moulding which can come into contact with the electrolyte and the resultant products, shields the metal shank and, where appropriate other metallic parts, more particularly the nipple, in gas-tight and liquid-tight manner. The material of the insulating moulding can also be, for example, ceramic of high temperature stability but also, for example, graphite, which is covered with an insulating coating. Such insulating ceramic or other materials of high temperature stability are known.

A series of advantages, which will be described subsequently, is achieved by the use of a detachably surmountable moulding, more particularly in the form of a series of tubular sections, segments or half shells.

According to one preferred embodiment of the electrode according to the invention the insulating moulding is disposed between a bottom part region of the top portion of metal and the bottom active portion so that the external edges of the moulding extending in the direction of the electrode axis and the external edges of the outer region of the top portion of metal are substantially flush with each other.

The electrode according to the invention is not subject to any restrictions regarding the abutment which supports the insulating coating or the moulding. This can also be made of a mating member of insulating metal, capable of withstanding high temperature stresses, it can be the screw nipple itself and where appropriate can also be a component of the active part or a combination thereof. Generally however the insulating moulding will not bear solely on the active part, to the extent to which this consists of a consumable material, but will be supported at least partially by a non-consumable heat resistant material.

The position of the moulding can of course be controlled in suitable manner when the electrode is produced. In one preferred embodiment of the electrode according to the invention the insulating moulding can also be thrust onto the abutment by pins, screw fasteners etc. provided in bores in the top portion, for example by the additional provision of springs, even during operation of the electrode without the need for removing the electrode from the electrolysis furnace. Irrespective of the provision of bores and screw fasteners or the like it can also be advantageous to mount the insulating moulding slidingly or loosely with respect to the metal shank so that in the event of failure of a part segment or breakage of an individual tube, for example due to mechanical damage, the remaining part segments which are intact or the individual tube itself are able to slip forward, i.e. they are able to move in the direction of longitudinal axis of the electrode.

Where an extreme safety design of the electrode is essential it is also possible to cover the internally disposed metal shank, which is protected by the insulating coating, with an additional highly stressable, conductive or insulating thin coating. This can be a ceramic coating and can function as an additional heat shield or inert shield. The attack of electrolysis media can also be advantageously prevented by making the coating very dense.

Depending on the use of the electrode it is possible to mount the insulating moulding on retainers which are advantageously attached to the metal of the inner cooling unit. This will be considered primarily for uses of the electrode where free movability or advancing of intact (insulating or electrically conductive) individual segments is not essential in the event of damage of one of the segments situated below.

Within the scope of the invention it is also possible for the insulating moulding to surround not the entire region of the metal shank but an insulating, highly refractory injection compound, anchored to retaining members, is used in place of the extending moulding in a zone where lower stresses can be expected. Such insulating injection compounds are known and can be attached by means of retaining members, for example by means of soldering.

It is particularly advantageous if the moulding is surmounted in gas-tight or liquid-tight manner at least in the region which can come into contact with the electrolyte and the resultant products.

The top and bottom portions can be interconnected by means of a nipple which is cylindrical on the metal side and conical on the active side or vice versa. This part of the construction has proved itself, especially in tests. Metal, such as cast iron, nickel or a temperature-resistant, corrosion-resistant metal alloy, can be considered as the material of the nipple. Nipple connections of graphite itself are also considered as nipple connections, because of the high stability to alternating temperatures.

According to a special embodiment of the invention the bottom portion can comprise several units which are retained by one or more nipple connections and the active units are arranged adjacently or one below the other. The inclusion of an "insert" member between the top portion and the bottom portion is advantageous, if the bottom consumable portion is connected to the insert member by means of a nipple connection, for example of graphite, because this nipple connection between the metal shank and the graphite insert member remains cooler and the consumable piece can be completely consumed without endangering the top portion. Otherwise, to protect the nipple and the lower part of the top zone, a safety zone would have to be provided for the consumable endpiece, and this safety zone would be lost.

It is also possible and in many cases desirable if the active part of the electrode is constructed of a plurality of tubes, rods and/or plates with a preferential orientation which corresponds to the current supply direction. Such systems are described in detail in the Applicant's European Patent Application No. 80103126.1, which is specifically cited in this context and whose principle is to be fully included herein, especially with regard to the constructive embodiment of the active part.

Finally, in view of the temperature stresses imposed on the nipple it can be advantageous for this to be laterally slotted to compensate for thermal stresses.

According to one preferred embodiment of the electrode according to the invention the inner part and the bottom portion or active part thereof and/or its screw-mounting extend into a zone of high conductivity. This zone of high conductivity can, for example, represent a vessel which is filled under electrolysis conditions with liquid metal of high conductivity. This avoids energy losses in the region of the top part of the active rods, plates and the like, for example if these consist of ceramic material. The ceramic materials have an adequate conductivity only at elevated temperatures so that in such a case it can be significant to maintain the upper shank of the active (ceramic) rods at an elevated temperature. Metals with a suitable melting point, for example bismuth, can be mentioned as suitable metals.

The electrode according to the invention offers a series of advantages: special mention should be made of the extremely low current or voltage losses on the path to the active part of the electrode. By contrast to conventional solid blocks, whether or carbon, graphite or ceramic material, this enables a substantial energy saving to be achieved. Furthermore, side wear is minimized since it is no longer the entire electrode but only the active part thereof which is exposed to the corrosive electrolysis medium and the resultant reaction gases and vapours. Finally, the electrode is versatile because its construction permits the use of the entire spectrum of active materials which can fundamentally be employed in the field of fused melt electrolysis.

Furthermore, during production the insulating moulding can readily be introduced into a purpose adapted position. By the use of an insulating, externally disposed solid part it is possible to improve the mechanical stressability. By subdividing the insulating external zone into segments it is not necessary, in the event of defects or damage, to replace the entire electrode, since the damage can be economically and rapidly remedied by the introduction of a corresponding part member. The loose surmounting of the insulating moulding, to the extent to which this is formed from segments, results in "automatic" follow up of the segments above in the event of mechanical or other damage of protective segments disposed below, and this can be ensured where appropriate by attached springs. Accordingly, the electrode continues to be operational even after damage has already taken place, since the most endangered electrode region at the bottom, nearest to the operating zone of the electrode, is "automatically" protected by the sliding down of intact elements.

During manufacture the insulating moulding can also be introduced in a purpose-adapted position. The mechanical stressability can be improved by the use of an insulating, externally disposed solid part. By dividing the insulating external zone into segments it will not be necessary to exchange the entire electrode in the event of breakdown or damage, since the damage can be economically and rapidly remedied by the introduction of the appropriate part member. Such loose mounting of the insulating moulding, to the extent to which this is formed from a plurality of part members, leads to an "automatic" follow-up movement of the above disposed segments in the event of mechanical or other destruction of defective segments situated below, and this can be additionally ensured, where appropriate, by attached springs. The electrode therefore continues to be operational, even when damage has already taken place, since the most endangered electrode region at the bottom, nearest to the working zone of the electrode, is "automatically" protected by the downwards sliding of elements which are intact.

Although the insulating moulding or the insulating coating, if this comprises a series of individual segments or half shells, can have some clearance obtained by the kind of axial and internal support, the tongue and groove system will provide complete and comprehensive protection for the sensitive metal region of the electrode. If the bottom region of the "protective shield" of the electrode is nevertheless damaged, the electrode can usually continue to operate, for as long as is necessary to replace the consumable part, for example of graphite. When the electrode is removed, the damaged individual segment etc. can readily be replaced.

The invention subdivision of the metal shank also provides advantageous electrode properties. By virtue of the water conducted in the interior of the electrode the latter remains intact even if the external part is damaged. When the external region of the top portion is damaged it is therefore not necessary to shut down the supply of coolant and to empty the electrode etc. Owing to the sample detachability of the outer portion the latter can be easily exchanged as a component if damaged while the conventional construction would call for complete repair of the metal shank or replacement thereof. The lateral current supply, for example by means of graphite contact jaws or segments, which are attached, for example in retaining pockets, makes it unnecessary to remove the electrode in its entirety from the contact rail in the event of defects in the region of the internal liquid supply means, since it is merely necessary for the internal part to be detached. By constructing the top region as a portion of larger diameter and a portion of smaller diameter it is possible for an insulating protective layer of high temperature resistance to be attached in a particularly compact and convenient form and it may then not be necessary to additionally protect the outer part in insulating manner if said outer part is confined to the region of the current supply means.

Some particularly preferred electrode constructions in accordance with the invention, intended especially for use as anodes, are shown in FIGS. 1 to 6. Particularly those electrodes and anodes are shown in which the top portion of conductive metal has an upper part of larger diameter and a lower part of smaller diameter. The part of smaller diameter is then at least partially covered by the insulating moulding. This arrangement is especially preferred within the scope of the invention although the invention is neither confined thereto nor is it restricted to the particularly advantageous embodiments in accordance with the illustrations below. Identical components have the same reference numerals in the illustrations in which:

Figure 1:
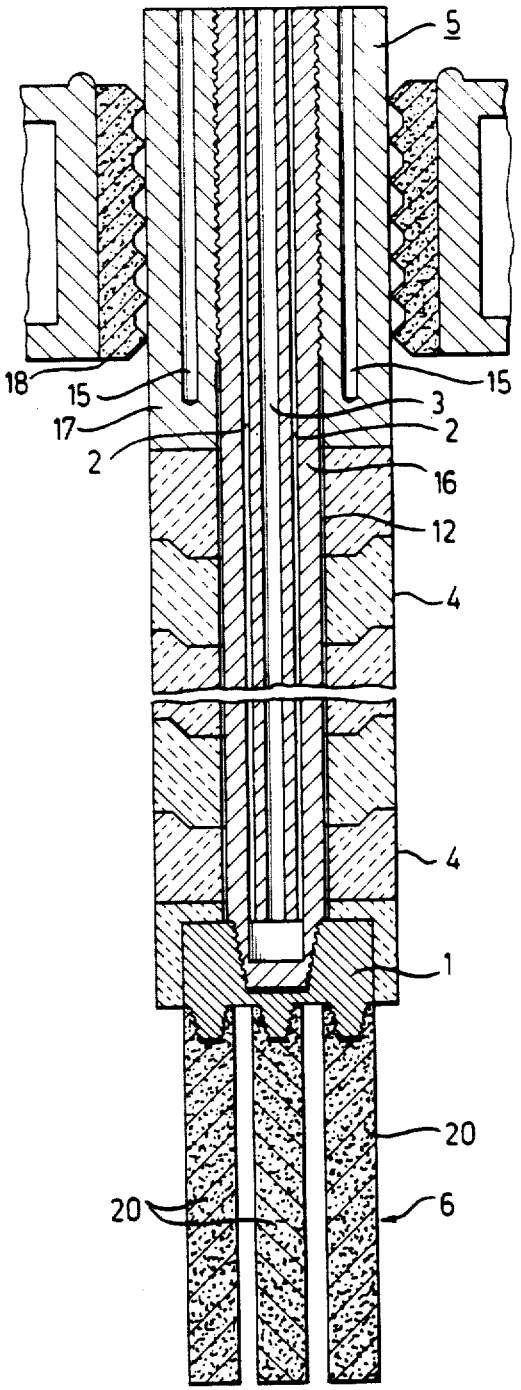
FIG. 1 is a longitudinal section through an electrode according to the invention.

In the electrode, for example according to FIG. 1, the cooling medium, such as water, air or inert gas, is introduced through the header duct 2 and returned through the return duct 3. The cooling system is disposed in the inner part 16 on which the outer part 17 is surmounted. Cooling medium also enters into a chamber within the screw nipple 1, for example formed of cast iron. The top portion 5 of metal, for example Cu, comprises a top region of larger diameter and a lower region of smaller diameter extending as far as the screw nipple 1 which forms the connection to the bottom portion 6 of active material, for example graphite. The insulating moulding 4 is supported by an abutment 7, for example of insulating ceramic of high thermal stability. In the top region the insulating moulding 4 is defined by the top edge of the large diameter region of the metal shank. In the electrode illustrated in FIG. 1, the insulating moulding 4 is subdivided into segments which can slide in the direction of the electrode axis if a (bottom) segment should break out.

Figure 2:
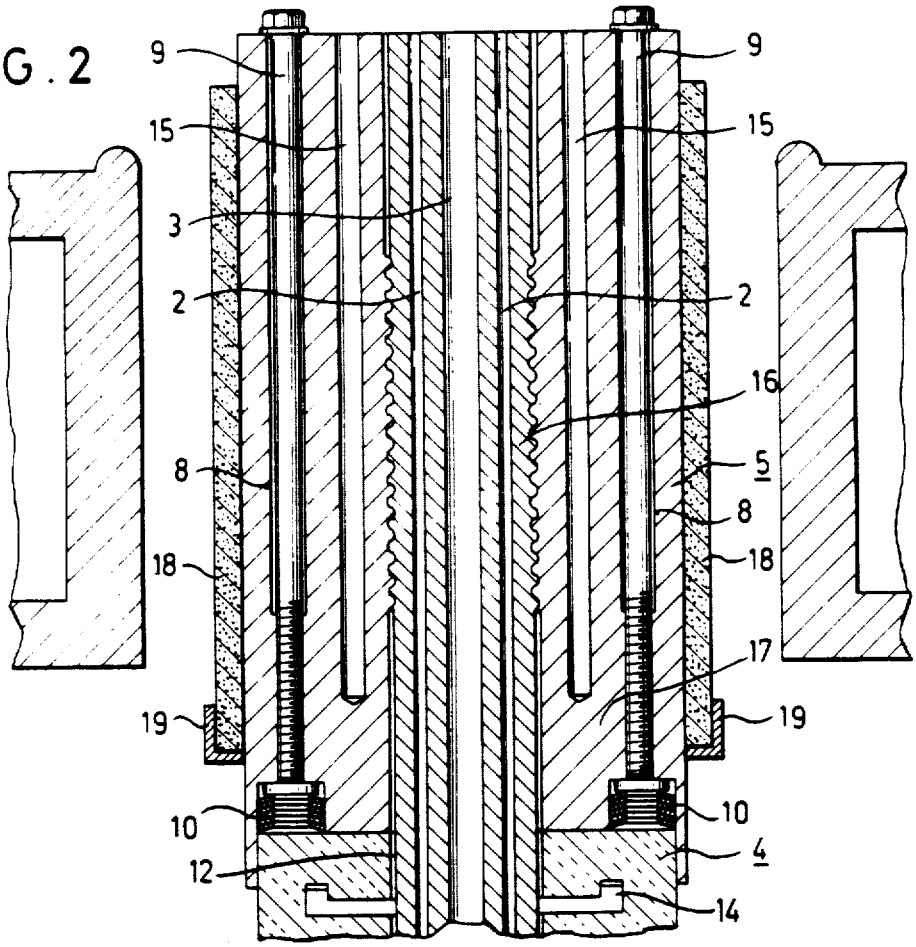
FIGS. 2 and 3 show a longitudinal section through an electrode according to the invention, in which the region protected by insulation is not shown completely and the adjoining active part is not shown.
Figure 4:
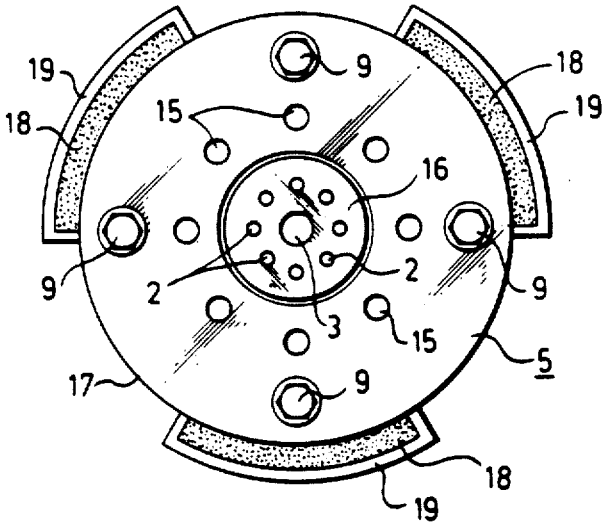
FIG. 4 is a cross-section through the top portion of metal or the part region thereof of larger diameter.
Figure 3:
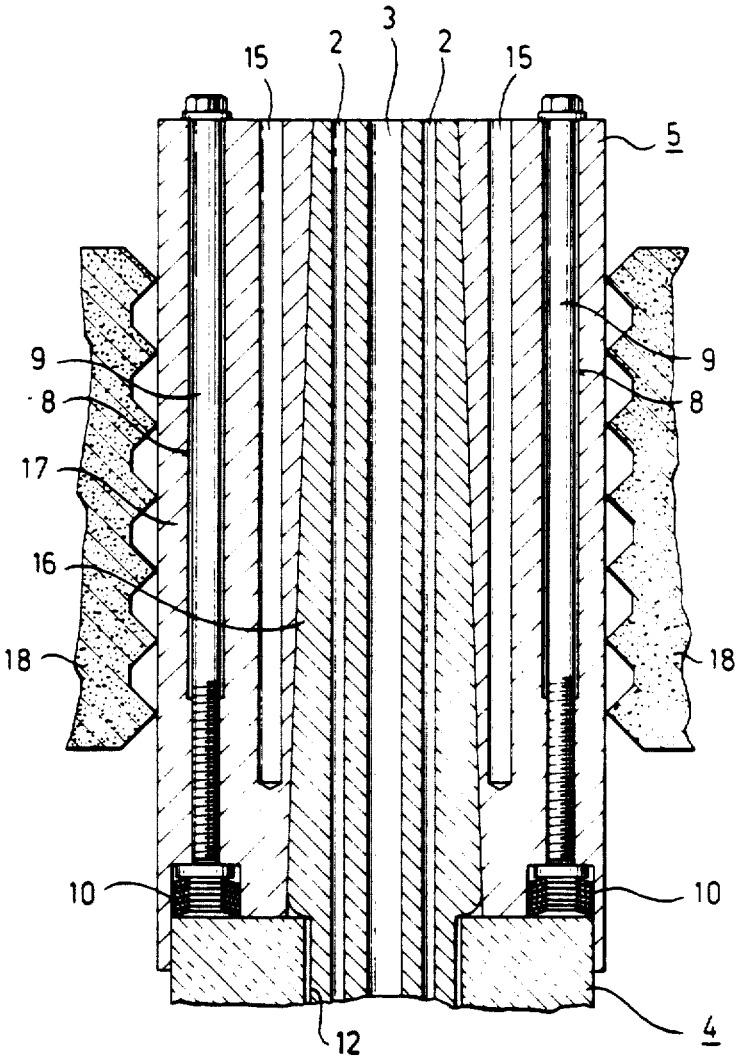

FIGS. 1 to 3 show some of the preferred means of connecting the inner part 16 and the outer part 17 as a register member, where appropriate with an additional partial screwthreading. Pins 9 or the like can be guided through bores 8 to retain the insulating coating 4 on an abutment 7 by means of the spring 10. The insulting member can be additionally secured by retaining means 14. The outer part reveals cooling ports 15 while connecting jaws 18, for example of graphite, are shown on the outside. The latter can be held in retaining means or in pockets 19 which are attached to the outer edge of the metal shank, as also shown in FIGS. 2 or 4.

Figure 5:
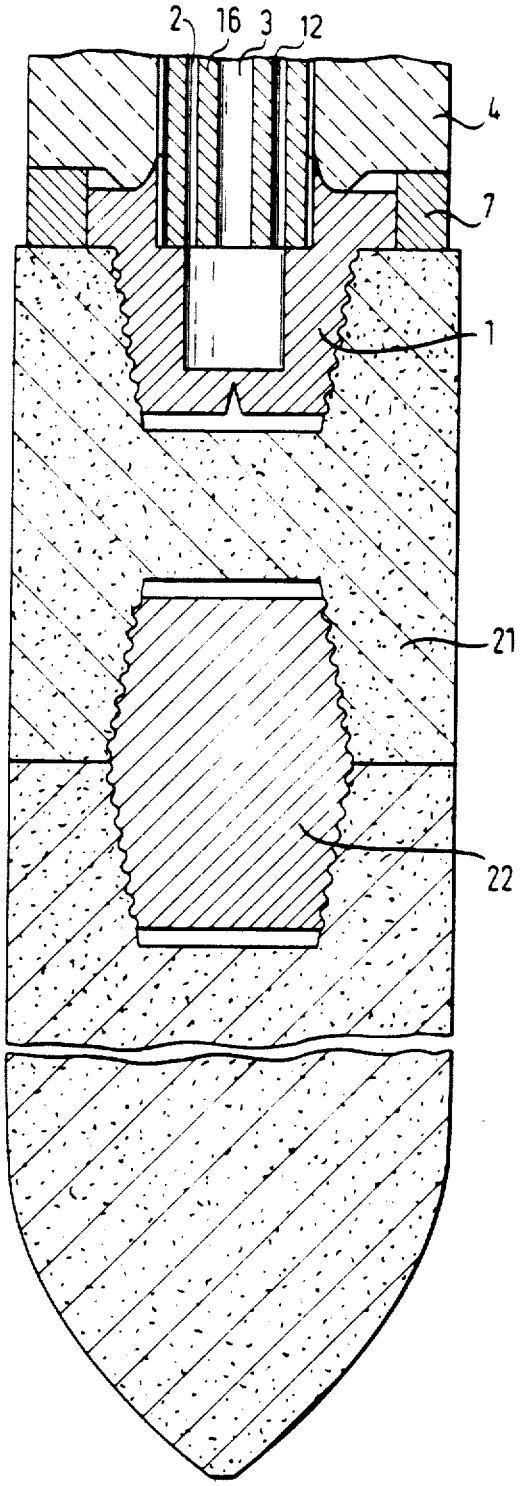
FIG. 5 is a longitudinal section through the bottom electrode portion with the intermediate member inserted.

FIG. 5 finally shows an insertion member 21, for example of graphite, which is connected to the top portion 5 by means of a nipple 1, slotted to compensate thermal stresses and advantageously consisting of coipper. The insertion member 21 is then connected to the actual active member by means of an additional nickel connection 22, which is advantageously formed from graphite. In this case, the active member is integrally constructed while in FIG. 1 it is divided into individual tubes or rods 20.

Gas flashing ducts, not shown in detail in the illustrations, can be provided between the insulating stratum 4 and especially the inner part 16 of the top portion 5. Any damage to the insulating ceramic can be readily detected by gas flushing, for example by reference to a corresponding pressure drop. A certain cooling action is also possible. It is also within the scope of the invention—also not shown in the illustrations,—that the inner part 16 and/or the nipple connection or its external surfaces or the insertion member 21 can be provided with a coating of high temperature stability. The coating 12 of high temperature stability associated with the top portion 5 can be electrically conductive or insulating depending on the dimensions of the insulating coating 4 of high temperature stability situated thereabove. An insulating embodiment would thus provide a certain line of protection which can come into action in the event of breakage of the externally disposed insulating coating 4. If such an event is not expected, depending on operating conditions, the coating, for example of the inner part 16, can also consist of conductive material of high temperature stability, which will then perform the action of a "heat shield" or "insert shield" to protect the metal disposed therebelow.

Figure 6:
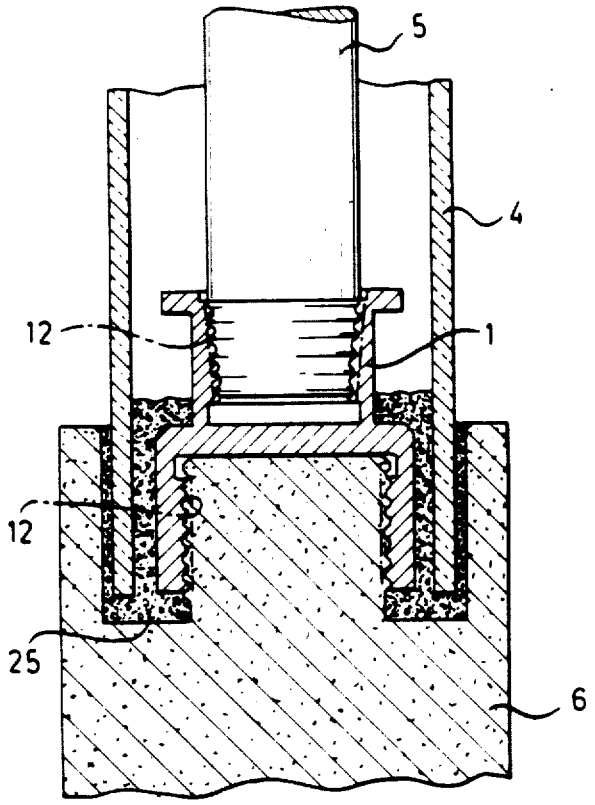
FIG. 6 is a longitudinal section of an anode according to the invention, particularly intended for obtaining magnesium.

FIG. 6 shows an anode especially intended for the production of aluminium. It comprises a plate 6, for example of graphite, with an annular, milled head part. This is connected by means of the appropriately constructed nipple 1, for example of pure nickel, to the top portion 5. The interior of the nipple connection contains a contact coating 12, for example of platinum. The insulating coating 4 is constructed in the form of a ceramic tube, for example of high density sillimanite. It is supported by a refractory cement. The ceramic tube extends beyond the cell lid and shields the metal shank against corrosion. This solution to the problem takes special account of the different coefficients of expansion of graphite and metal.

We claim:

1. Apparatus for for fusion electrolysis, particularly for the electrolytic production of metals such as aluminum, magnesium, sodium, lithium or compounds thereof comprising a metallic top portion having an inner part with an upper and lower region and an outer part which outer part detachably receives at least the upper region of said inner part, a bottom portion of replaceable active material connected to said top portion by screwmounting means, and an insulating coating of high temperature stability, wherein said inner part extends substantially as far as said screwmounting means and wherein said insulating coating is a detachably mounted moulding protecting at least the lower region of said inner part.

2. An electrode as claimed in claim 1, wherein said inner part has a cooling device with a header duct and a return duct.

3. An electrode as claimed in claim 1, wherein said outer part is a terminal electrode.

4. An electrode as claimed in claim 3, wherein said outer part is provided with cooling ports and retaining bores.

5. An electrode as claimed in claim 1, wherein said insulating coating protects the lower region of said inner part in a fluid tight manner, at least in the region which can come into contact with the electrolyte and resultant products.

6. An electrode as claimed in claim 1, wherein said screwmounting means is a screw nipple.

7. An electrode as claimed in claim 1, wherein the detachable connection of said inner and outer parts is obtained by screw threading.

8. An electrode as claimed in claim 1, wherein the detachable connection of said inner and outer parts is obtained by registered fitting.

9. An electrode as claimed in claim 8, wherein said fitting is a taper fit and wherein additional screw threading means is provided in a region of said inner and outer parts.

10. An electrode as claimed in claim 1, wherein graphite connecting jaws are mounted on said outer part by retaining means.

11. An electrode as claimed in claim 1, wherein said insulating coating is a detachably mounted moulding.

12. An electrode as claimed in claim 1, wherein said moulding is tubular and surrounds the bottom region of said top portion substantially as far as said screwmounting means.

13. An electrode as claimed in claim 12, wherein said tubular moulding is made of separable portions.

14. An electrode as claimed in any of claims 12 to 13, wherein said moulding and the external edges of said top portion are substantially flush with one another.

15. An electrode as claimed in claim 14, wherein said moulding is at least partly supported by said bottom portion.

16. An electrode as claimed in claim 14, wherein said moulding is at least partly supported by said screwmounting means.

17. An electrode as claimed in claim 14, wherein a cut is provided in said top portion and an abutment is provided in the region of said screwmounting means, and wherein said moulding is supported between said cut and said abutment.

18. An electrode as claimed in claim 17, wherein said moulding is resiliently retained on the abutment fastening means guided in bores of said top portion.

19. An electrode as claimed in claim 1, wherein said top portion has a smaller diameter region which is covered with a dense, high stressable, conducting coating of ceramic.

20. An electrode as claimed in claim 14, wherein said insulating moulding consists of ceramic of high temperature stability covered with an insulating coating.

21. An electrode as claimed in claim [21] *14*, wherein said insulating moulding consists of graphite tubing covered with an insulating coating.

22. An electrode as claimed in claim 14, wherein said insulating moulding is mounted on retainers which are attached to the top portion.

23. An electrode as claimed in claim 19, wherein in the top region of said smaller diameter region, the insulating moulding is partially replaced by an insulating highly refractory injection compound which is anchored to retaining members.

24. An electrode as claimed in claim 22, wherein said insulating moulding is supported so that in the event of failure of a part segment or damage of the individual tube, the remaining intact partial segment or the individual tube itself can move in the direction of the longitudinal electrode axis towards the stressing zone.

25. An electrode as claimed in claim 1, wherein said screwmounting means comprises a screw nipple which is cylindrical on the side of one of said metal and consumable portions and conical on the side of the other of said portions.

26. An electrode as claimed in claim 25, wherein said screw nipple comprises cast iron.

27. An electrode as claimed in claim 25, wherein said screw nipple means comprises graphite.

28. An electrode as claimed in claim 1, wherein said bottom portion comprises a plurality of adjacently arranged units which are retained by one or more nipple connections.

29. An electrode as claimed in claim 1, wherein said bottom portion comprises a plurality of units arranged one below the other, which are retained by one or more nipple connections.

30. An electrode as claimed in claim 25, wherein the inner part of said top portion and said bottom portion are screwmounted to each other in addition to said screw nipple.

31. An electrode as claimed in claim 28 or claim 29, wherein said screw nipple or nipples is or are slotted.

32. An electrode as claimed in claim 1 wherein the inner part and the bottom portion or active part thereof and the screw mounting extend into a zone of high conductivity.

33. An electrode as claimed in claim 32 wherein said zone of high conductivity is a vessel filled with high conductive metal which is liquid under electrolysis conditions.

34. An electrode as claimed in claim 1 wherein said insulating coating is in the form of a series of tubular sections, segments or half shells.

* * * * *

UNITED STATES PATENT AND TRADEMARK OFFICE

CERTIFICATE OF CORRECTION

PATENT NO. : RE 32,426

DATED : May 26, 1987

INVENTOR(S) : Konrad Koziol, et al.

It is certified that error appears in the above-identified patent and that said Letters Patent are hereby corrected as shown below:

On the cover page, under the words "United States Patent" and after the word "Koziol" should be added -- et al.--

On the cover page, in the inventorship paragraph, after the words "Pegnitz, Fed. Rep. of Germany" should be added --; Malcolm F. Pilbrow, Claremorris, Ireland; Christine Zöllner, Schwaig b. Nürnberg, Fed. Rep. of Germany; Dieter H. Zöllner, Claremorris, Ireland --.

Signed and Sealed this

Twenty-sixth Day of January, 1988

*Attest:*

DONALD J. QUIGG

*Attesting Officer*

*Commissioner of Patents and Trademarks*